United States Patent
Wu et al.

(10) Patent No.: US 10,783,521 B2
(45) Date of Patent: Sep. 22, 2020

(54) DYNAMIC GATING FRAUD CONTROL SYSTEM

(71) Applicant: Microsoft Technology Licensing, LLC, Redmond, WA (US)

(72) Inventors: Weiwei Wu, Bellevue, WA (US); Adam Feldman Reinhardt, Redmond, WA (US); Shoou-Jiun Wang, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 258 days.

(21) Appl. No.: 15/678,748

(22) Filed: Aug. 16, 2017

(65) Prior Publication Data

US 2019/0005504 A1    Jan. 3, 2019

Related U.S. Application Data

(60) Provisional application No. 62/526,786, filed on Jun. 29, 2017.

(51) Int. Cl.
| | |
|---|---|
| G06Q 20/10 | (2012.01) |
| G06Q 20/32 | (2012.01) |
| G06Q 20/40 | (2012.01) |
| G06Q 20/42 | (2012.01) |
| G06Q 20/38 | (2012.01) |

(52) U.S. Cl.
CPC ....... *G06Q 20/4016* (2013.01); *G06Q 20/389* (2013.01); *G06Q 20/405* (2013.01); *G06Q 20/42* (2013.01)

(58) Field of Classification Search
CPC ... G06Q 20/4016; G06Q 20/405; G06Q 20/42
USPC .......................................................... 705/39
See application file for complete search history.

(56) References Cited

U.S. PATENT DOCUMENTS

| | | |
|---|---|---|
| 8,571,982 B2 | 10/2013 | Choudhuri et al. |
| 8,600,873 B2 | 12/2013 | Fisher |
| 8,655,724 B2 | 2/2014 | Chow et al. |

(Continued)

OTHER PUBLICATIONS

Zhang, et al., "Cantina: A Content-Based Approach to Detecting Phishing Web Sites", In Proceedings of the 16th international conference on World Wide Web, May 8, 2007, pp. 639-648.

*Primary Examiner* — Hai Tran
(74) *Attorney, Agent, or Firm* — Workman Nydegger (57) ABSTRACT

Reducing an amount of data transactions that are subjected to further review when determining if the data transactions should be approved or rejected. A risk score that defines a first cutoff and a second cutoff are determined. During a first time period, the first and second cutoffs are extended to increase data transactions subject to further review and to create an opportunity group of data transactions not previously approved that are now approved. A rejection rate of the data transactions subject to further review is compared to a threshold. When the rejection rate is no more than the threshold, during a second time period, a volume of the data transactions subject to further review is minimized and a second opportunity group of data transactions not previously approved that are now approved is created. The rejection rate of the data transactions subject to further review are again compared to the threshold.

20 Claims, 4 Drawing Sheets

(56) References Cited

U.S. PATENT DOCUMENTS

| | | | |
|---|---|---|---|
| 2013/0024358 A1* | 1/2013 | Choudhuri | G06Q 20/4016 705/38 |
| 2015/0046181 A1 | 2/2015 | Adjaoute | |
| 2016/0132886 A1 | 5/2016 | Burke et al. | |
| 2016/0350758 A1 | 12/2016 | Zoldi et al. | |

* cited by examiner

|      | Day1   | Day2   | Day3   |
|------|--------|--------|--------|
| ToD1 | Group1 |        |        |
| ToD2 |        | Group4 |        |
| ToD3 |        |        | Group7 |
| ToD4 | Group2 |        |        |
| ToD5 |        |        | Group8 |
| ToD6 |        | Group5 |        |
| ToD7 | Group3 |        |        |
| ToD8 |        | Group6 |        |
| ToD9 |        |        | Group9 |

510 — Determining Risk Scores For A Plurality Of Data Transactions, The Risk Scores Defining A First Cutoff Between A First Portion Of The Plurality Of Data Transactions That Are To Be Approved And A Second Portion Of The Plurality Of Data Transactions That Are To Be Subjected To Further Review And A Second Cutoff Between The Second Portion And A Third Portion Of The Plurality Of Data Transactions That Are To Be That Are To Be Rejected 520 — During A First Time Period, Extending The First And Second Cutoffs Such That The Second Portion Includes Some Of The Data Transactions Of The First Portion And Third Portion That Were Not Previously Included In The Second Portion 530 — During The First Time Period, Creating An First Opportunity Group Of Data Transactions That Are To Be Approved, The First Opportunity Group Including At Least Some Data Transactions That Were Part Of The Second And Third Portions 540 — During The First Time Period, Comparing A Rejection Rate Of The Data Transactions Included In The Second Portion To A Threshold To Determine If The Rejection Rate Is No More Than The Threshold 550 — In Response To Determining That The Rejection Rate Is No More Than The Threshold, An Act Of, During A Second Time Period, Minimizing A Volume Of The Second Portion By Removing Some Of Data Transactions From The Second Portion That Were Included During The First Time Period 560 — During The Second Time Period, Creating A Second Opportunity Group Of Data Transactions That Are To Be Approved, The Second Opportunity Group Including At Least Some Data Transactions That Were Part Of The Second And Third Portions During The First Time Period, Wherein The Second Opportunity Group Is Larger Than The First Opportunity Group 570 — During The Second Time Period, Comparing The Rejection Rate Of The Data Transactions Included In The Second Portion To The Threshold To Determine If The Rejection Rate Is No More Than The Threshold

*Fig. 5*

DYNAMIC GATING FRAUD CONTROL SYSTEM

CROSS-REFERENCE TO RELATED APPLICATIONS

This application claims the benefit of and priority to U.S. Provisional Patent Application Ser. No. 62/526,786 filed on Jun. 29, 2017, and entitled "DYNAMIC GATING FRAUD CONTROL SYSTEM," which application is incorporated herein by reference in its entirety.

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been, and are being, developed in all shapes and sizes with varying capabilities. As such, many individuals and families alike have begun using multiple computer systems throughout a given day.

For instance, computer systems are now used in ecommerce and the like as individuals increasing perform financial transactions such as making a purchase from various vendors over the Internet. In order to perform the financial transactions, the individuals are typically required to provide a payment instrument such as a credit card or bank account information such as a checking account to the vendor over the Internet. The vendor then uses the payment instrument to complete the transaction.

The process of providing the payment instrument over the Internet leaves the various merchants subject to loss from fraudulent transactions. For example, when a fraudulent payment instrument is used to purchase a product, the merchants often loses the costs associated with the product. This is often because the bank or financial institution that issues the payment instrument holds the merchants responsible for the loss since it was the merchants who approved the transaction at the point of sale where payment instrument is not present.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments herein are related to system, methods, and computer readable media for reducing an amount of data transactions that are subjected to further review when determining if the data transactions should be approved or rejected. In the embodiments, a risk score for various data transactions are determined. The risk scores define a first cutoff between data transactions that are approved and those subject to further review and a second cutoff between data transactions that are rejected and those subject to the further review. During a first time period, the first and second cutoffs are extended to increase the data transactions subject to further review and to create an opportunity group of data transactions not previously approved that are now approved. In addition, a rejection rate of the data transactions subject to further review are compared to a threshold. When the rejection rate is no more than the threshold, during a second time period a volume of the data transactions subject to further review is minimized and a second opportunity group of data transactions not previously approved that are now approved is created. The rejection rate of the data transactions subject to further review are again compared to the threshold.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 4 illustrates an embodiment of randomizing opportunity groups; and

FIG. 5 illustrates a flow chart of an example method for reducing an amount of data transactions that are subjected to further review when determining if the data transactions should be approved or rejected.

DETAILED DESCRIPTION

Fraud attackers typically keep testing a computing system that is used to approve or reject data transactions to identify one or more patterns where data transactions can bypass risk checks (most of the time not knowing the exact reasons why). Once the fraud attackers have identified such patterns, they will place many orders using data transactions that mimicking an approved data transaction to maximize their profit until the fraud pattern is identified and blocked. There are two types of constant fraud attacks that are desirable to prevent. The first pattern is single account with multiple trials. The second pattern is where multiple accounts attack simultaneously. Fraud attackers will use the first pattern less frequently than the first pattern since this approach is less expensive but easily detected by risk systems.

Some risk systems may provide a risk score for various data transactions, rejecting the data transactions with highest score, providing further review for medium score and approving the lowest score. The embodiments disclosed herein only reject the data transactions with highest score and randomly approve a subset of data transactions from medium to high score bands (which would be rejected by some risk systems), medium score bands (which would be reviewed by some risk systems) and low to medium score bands (which would be approved by some risk systems). This random approval may be used to help detect fraudulent attacks on the remaining data transactions. In some embodiments disclosed herein the approved subset may be referred to as an "opportunity group" as their purpose is to provide the opportunity of reducing false positives.

There are multiple advantages and technical effects for the embodiments disclosed herein, including:

Extending review spectrum: Data transactions that are slightly riskier than the review ones often have highest false positive (FP) rate in some risk systems; on the other hand, the data transactions slightly less risky than the review ones often have highest false negative (FN) rate. By reviewing more of those transactions to get immediate labeling, the embodiments disclosed herein will help decision accuracy and increase the chance of identifying current fraudulent attacks.

Equal or lower cost: different from some risk systems which review 100% of data transactions which are scored in the review band, the embodiments disclosed herein select a random sample, thus the cost can be set to be equal or less than the other risk systems.

Higher profit with minimal exposure: the embodiments disclosed herein utilize the fact that overall fraud rate is less than 1%. A ML model which can identify a subset of transactions with 20% of bad rate is extremely hard already, even so, rejecting the subset results in 80% FP rate.

Lower false alarms by using real time transactions as the baseline: many anomaly detection alarms are built on comparing historical and current distributions. This often results in many false alarms since attributes shift a lot in various data transaction environments by various reasons such as sale events, software updates etc. The embodiments disclosed herein do not compare distributions, instead, they use close to real time review results or anomaly detection to trigger alarms which are more accurate.

Some introductory discussion of a computing system will be described with respect to FIG. 1. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
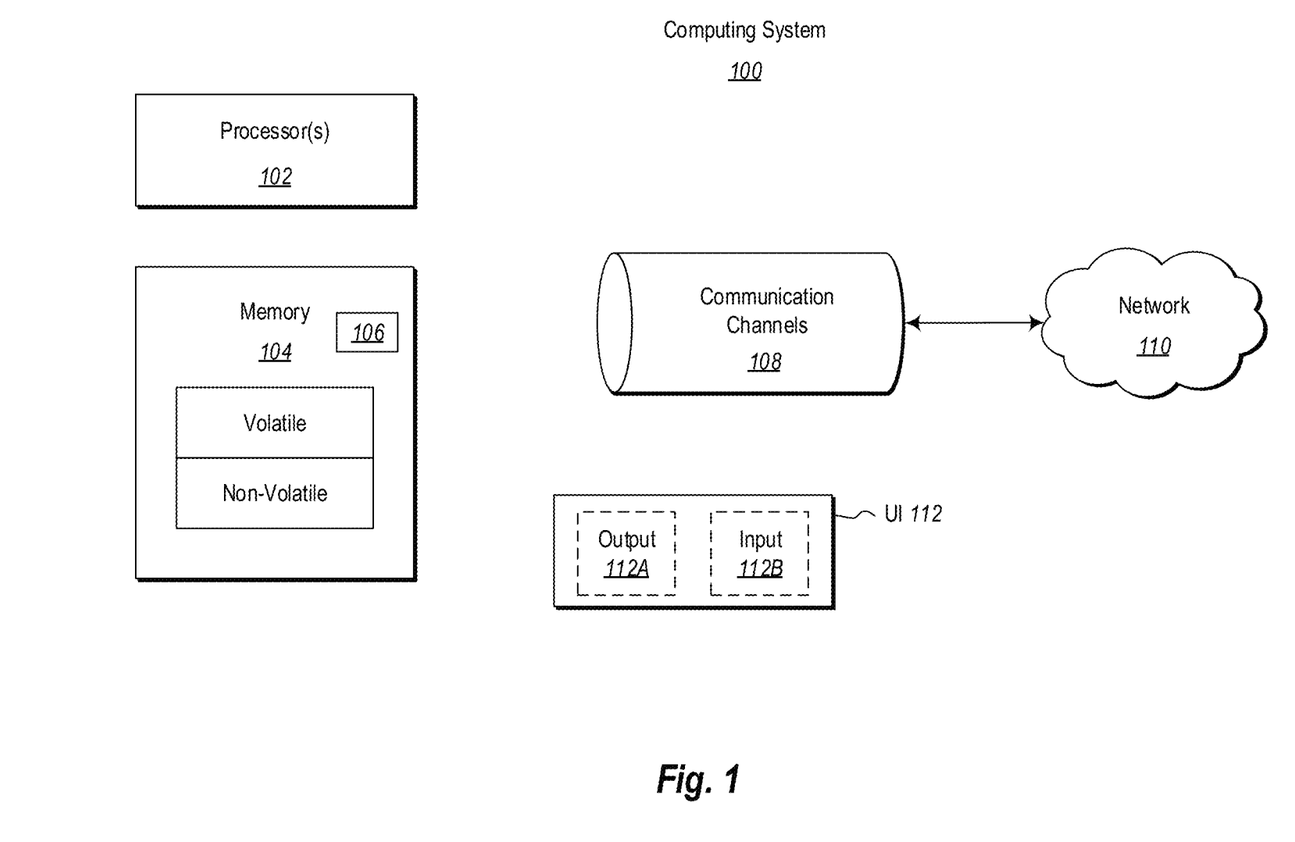
FIG. 1 illustrates an example computing system in which the principles described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
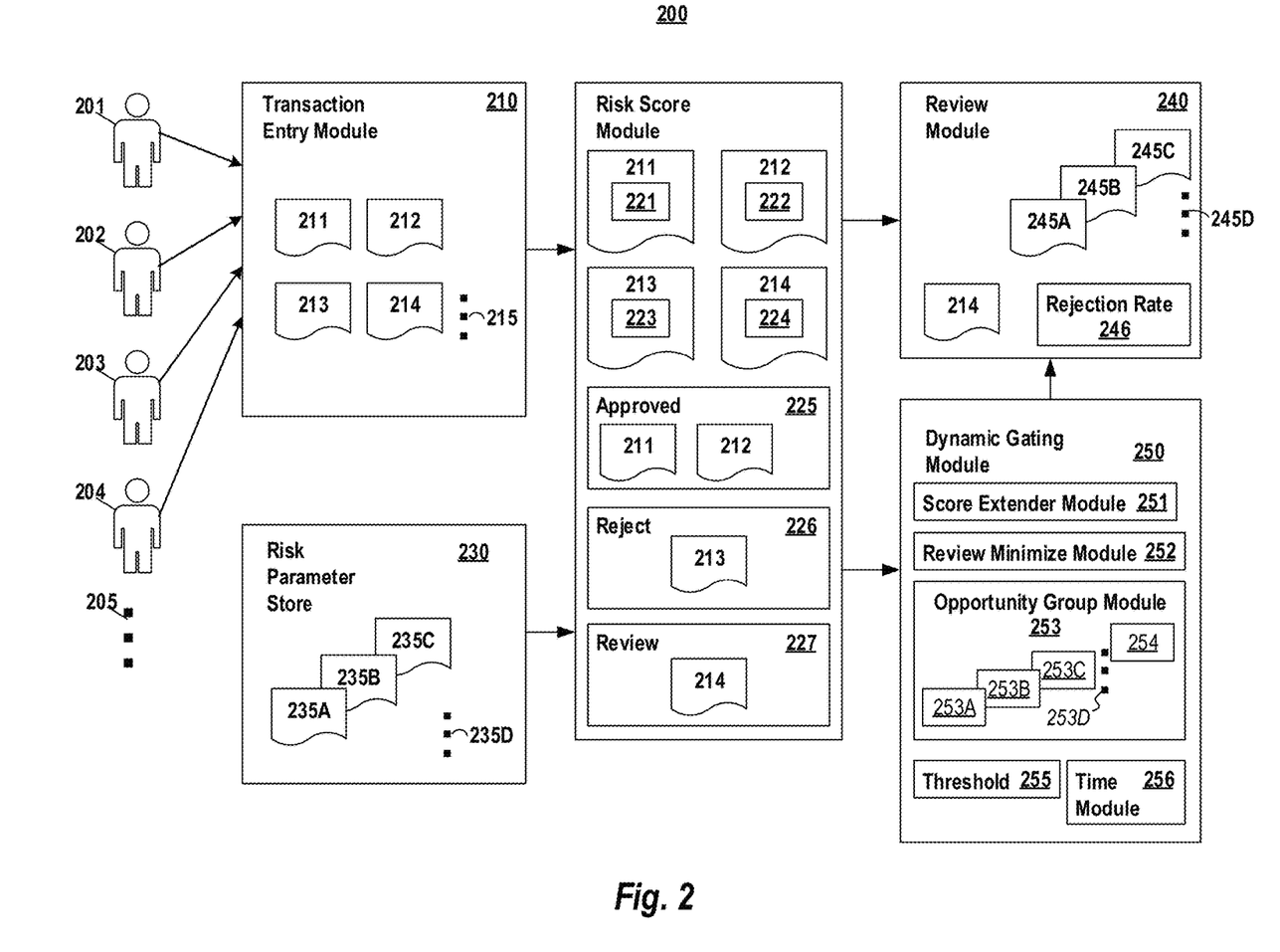
FIG. 2 illustrates a computing system that may implement the embodiments disclosed herein.

Attention is now given to FIG. 2, which illustrates an embodiment of a computing system 200, which may correspond to the computing system 100 previously described. The computing system 200 includes various components or functional blocks that may implement the various embodiments disclosed herein as will be explained. The various components or functional blocks of computing system 200 may be implemented on a local computing system or may be implemented on a distributed computing system that includes elements resident in the cloud or that implement aspects of cloud computing. The various components or functional blocks of the computing system 200 may be implemented as software, hardware, or a combination of software and hardware. The computing system 200 may include more or less than the components illustrated in FIG. 2 and some of the components may be combined as circumstances warrant. Although not necessarily illustrated, the various components of the computing system 200 may access and/or utilize a processor and memory, such as processor 102 and memory 104, as needed to perform their various functions.

As shown in FIG. 2, the computing system 200 may include a transaction entry module 210. In operation, the transaction module 210 may receive input from multiple users 201, 202, 203, 204, and any number of additional users as illustrated by the ellipses 205 to initiate a data transaction that is performed by the computing system 200. For example, the user 201 may initiate a data transaction 211, the user 202 may initiate a data transaction 212, the user 203 may initiate a data transaction 213, and the user 214 may initiate a data transaction 204. The ellipses 215 represent any number of additional data transactions that can be initiated by one or more of the users 205. Of course, it will be noted that in some embodiments a single user or a number of users less than is illustrated may initiate more than one of the transactions 211-215.

The data transactions 211-215 may represent various data transactions. For example, as will be explained in more detail to follow, the data transactions 211-215 may be purchase or other financial transactions. In another embodiments, the transactions 211-215 may be transactions related to clinical or scientific research results. In still, other embodiments, the transactions 211-215 may be any type of transaction that is subject to fraud and is thus able to be characterized as being properly accepted, improperly accepted, properly rejected, or improperly rejected as a result of the fraud. Accordingly, the embodiments disclosed herein are not related to any type of data transactions. Thus, the embodiments disclosed herein relate to more than purchase or financial transactions and should not be limited or analyzed as only being related to purchase or financial transactions.

The transaction entry module 210 may receive or determine information about each of the data transactions 211-215. For example, if the data transactions 211-215 are purchase or other financial transactions, then the transaction entry module 210 may determine personal information about the user, payment information such as a credit or debit card number, and perhaps the product that is being purchased. If the data transactions are clinical or scientific research data transactions, then the data transaction entry module 210 may determine identifying information about the research such as participant information and result information. The transaction entry module 210 may receive or determine other information about other types of data transactions as circumstances warrant.

The computing system 200 also includes a risk score module 220. In operation, the risk score module 220 may determine a risk score for each of the data transactions 211-215. For example, the score module may determine a risk score 221 for the data transaction 211, a risk score 222 for the data transaction 212, a risk score 223 for the data transaction 213, and a risk score 224 for the data transaction 214. The risk score module may also determine a risk score for each of the additional data transactions 215. As will be explained in more detail to follow, the risk scores 221-224 may specify if each of the data transactions 211-215 is to be approved (i.e., the data transactions are performed or completed), if the transactions are to be rejected (i.e., the data transactions are not completed or performed) or if further review is needed to determine if the data transaction should be approved or rejected.

In some embodiments, the decision analysis may be based at least in part on one or more risk parameters that are related to the data transactions. For example, as illustrated in FIG. 2, the computing system may include a risk parameter store 230. Although shown as being an independent, the risk parameter store 230 may be part of another element of the computing system 200.

As shown, the risk store 230 may include a first risk parameter 235a, a second risk parameter 235b, a third risk parameter 235c, and any number of additional risk parameters as illustrated by the ellipses 235d. The risk parameters may be also be referred to hereinafter as risk parameters 235.

In the embodiment related to the purchase or other financial transaction, the risk parameters 235 may be related to the product or service being purchased and to the purchaser of the product and service. For example, the first risk parameter 235a may specify a purchase price for the product or service, the second risk parameter 235b may specify the past payment history of the purchaser of the product and service, and a third risk parameter 235c may specify a profit margin for each transaction for the seller of the product or service. Other risk parameters 235d such as location of the data transaction may also be used. As will be appreciated, the various risk parameters may be those parameters that would likely indicate how trustworthy the purchaser of the product and service is and how much harm the seller of the product or service would suffer is the transaction were fraudulent as these types of parameters are relevant to risk.

In the embodiment related to the to the clinical or scientific research results, the risk parameters 235 may specify the amount of error that is acceptable, the research goals, and other relevant factors. These may be used by the risk score module 220 as needed. In other embodiments, various other risk parameters 235 may be used as needed by the risk score module 220.

In some embodiments, the risk score module 220 may perform a decision analysis on each of the data transactions when assigning the risk score to the data transaction. This decision analysis may be based on various factors that are indicative of whether a data transaction should be approved or rejected. For example, if data transaction is the purchase or other financial transaction, the factors may be related to risk analysis. For instance, the risk score module 220 may determine based on the information determined by the data transaction entry module 210 or by one or more of the risk parameters 235 that a purchase or other financial transaction is likely to be a fraudulent transaction and so a risk score that indicates the data transaction should be rejected may be assigned. Alternatively, the one or more of the risk parameters 235 or the information determined by the data transaction entry module 210 may cause the risk score module 220 to determine that the purchase or other financial transaction is likely to be a good transaction and so a risk score that indicates that the data transaction should be approved may be assigned.

Alternatively, the one or more of the risk parameters 235 or the information determined by the data transaction entry module 210 may cause the risk score module 220 to determine that the purchase or other financial transaction requires further review to determine if it should be approved or rejected and so a risk score that indicates that the data transaction should be subjected to further review may be assigned. It will be noted that such a risk score indicates that the one or more of the risk parameters 235 or the information determined by the data transaction entry module 210 is not conclusive as to whether the transaction should be accepted or rejected. For example, the past payment history of buyer may be suspect, the buyer may be located in a location that is well known for including fraudulent activity, or the purchase price of an item related to the data transaction may be high, thus subjecting the seller to greater risk. There may be other reasons why a review score may be assigned. As will be described in more detail to follow, the review risk score will cause that further review of the data transaction be performed before the final decision is made. In this way, there are further protections from data transactions that have a higher chance of being fraudulent, but do not rise to the level where they should be outright rejected.

If the data transaction is related to the clinical or scientific research results, the factors may be related to what type of errors have occurred. For example, in many research embodiments, there are Type I errors and Type II errors. The risk score 220 may accept a certain percentage of Type I errors and reject the rest and may also accept a certain percentage of Type II errors and reject the rest based on the determined risk score. In embodiments related to other types of data transactions, the risk 220 may use other factors as circumstances warrant.

Figures 3A, 3B:
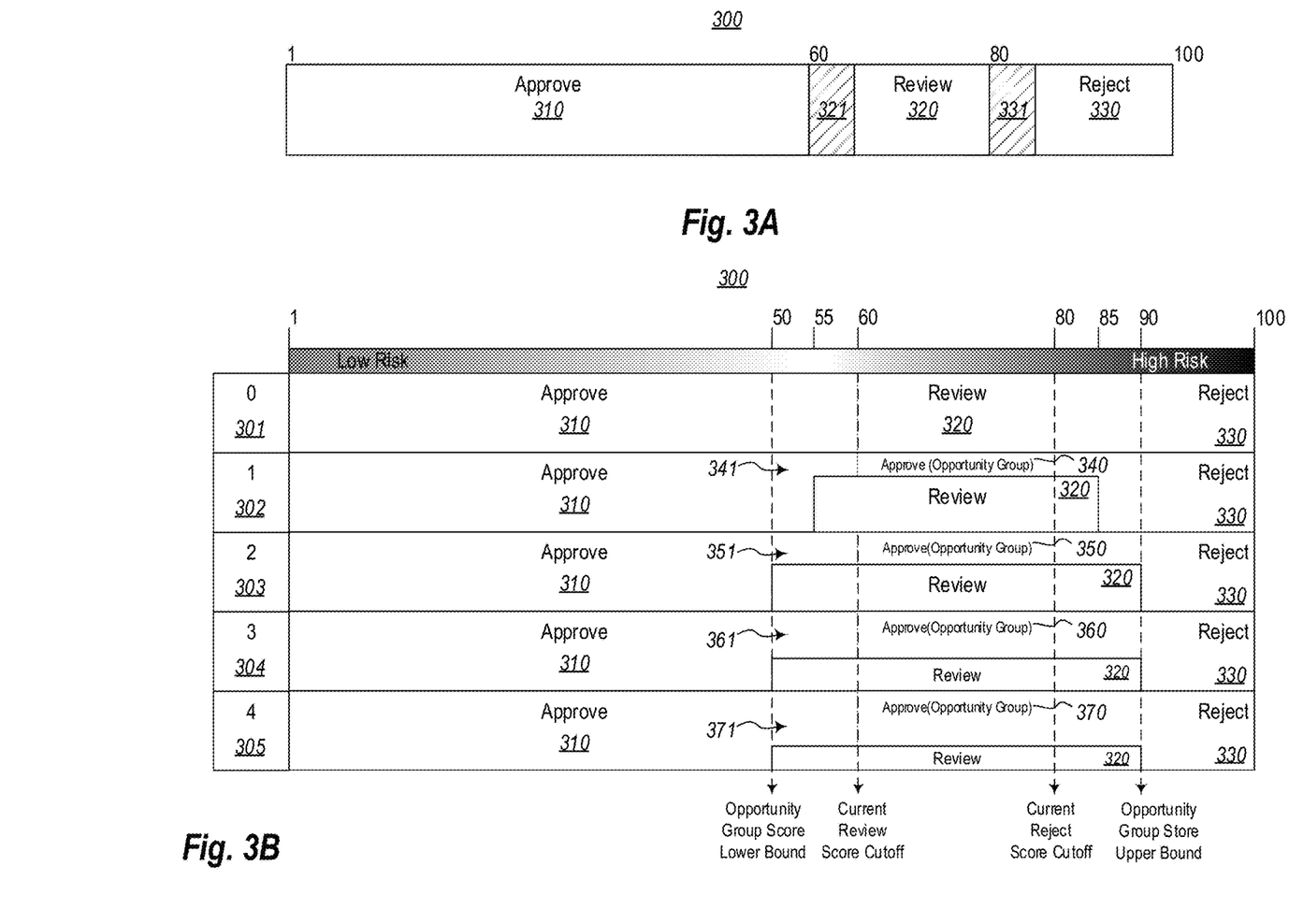
FIG. 3A illustrates an embodiment of a risk score band.
FIG. 3B illustrates an embodiment of an operation of a dynamic gate.

Once the risk score module 220 has determined a risk score for each of the data transactions 211-214, the risk score module 220 may determine if a data transaction should be approved, rejected or subjected to further review based on the risk score. That is, the risk score module 220 may set or otherwise determine a risk score cutoff or boundary for risk scores that will be approved, risk scores that will rejected, and risk scores that will be subjected to further review. For example, FIG. 3A shows risk scores from 1 to 100. As illustrated, those data transactions (i.e., data transactions 211-214) that are assigned a risk score (i.e., risk scores 221-224) between 1 and 60 are included in an approve portion 310 and those data transactions that are assigned a risk score from 80 to 100 are included in a rejected portion 330. However, those data transactions having a risk score between 60 and 80 are included in a review portion 320 that are to be subjected to further review. Thus, in the embodiment the risk score 60 is a first cutoff or boundary and the risk score 80 is a second cutoff or boundary. It will be noted the FIG. 3A is only one example of possible risk scores and should not be used to limit the embodiments disclosed herein. It As illustrated in FIG. 2, it is shown at 225 that the data transactions 211 and 212 have been approved because the risk scores 221 and 222 were in the risk score band that should be approved. For instance, in relation to the embodiment of FIG. 3A the risk scores 221 and 222 may be between 1 and 60. Accordingly, the data transactions are able to be completed by the computing system 200. The data transaction 213, on the other hand, is shown at 226 as being rejected because the risk score 223 was in the risk score band that should be rejected. For instance, in relation to the embodiment of FIG. 3A the risk score 223 was between 80 and 100. Accordingly, the data transaction is not completed by the computing system 200.

As further shown in FIG. 2 at 227, the data transaction 214 has been marked for further review because the risk score 224 was in the risk score band that should be subjected to further review. For instance, in relation to the embodiment of FIG. 3A the risk score 224 was between 60 and 80. Accordingly, the computing system 200 may also include a review module 240, which may be a computing entity or a human entity that utilizes the review module 240. In operation, the review module 240 receives the data transaction 214 and performs further review on the data transaction to determine if the data transaction should be accepted or rejected. For example, the review module may apply one or more additional review criteria 245a, 245b, 245c, and any number of additional review criteria as illustrated by ellipses 245d (hereinafter also referred to "additional review criteria 245"). In some embodiments the additional review criteria 245 may be to review of social media accounts of the initiator of the data transaction, review and/or contact of third parties associated with the initiator of the data transaction, contact with a credit card company that issues a credit card associated with the initiator of the data transaction, or direct contact with the initiator of the data transaction through a phone call, SMS, email, or other real time (or near real time) forms of communication. It will be appreciated that there may be other types of additional review criteria.

Based on the results of the additional review criteria 245, the review module may determine if the data transaction 214 should be accepted or rejected. For example, if the additional review criteria indicate that it is likely that the data transition 214 is a valid, non-fraudulent transaction, then the data transaction 214 may be approved. On the other hand, if the additional review criteria indicate that it is likely that the data transition 214 is a fraudulent transaction, the data transaction may be rejected. The determination of the review module may be provided to the risk score module 220 and the data transaction 214 may be added to the approved data transactions 225 and allowed to be completed or added to the rejected data transactions 226 and not allowed to be completed.

The review module 240 may keep track of a rejection rate 246 that specifies how many of the data transactions in the review portion are rejected. For example, in one embodiment around 80% of the data transactions in the review portion 320 during a given time period are ultimately approved and so the rejection rate 246 may be 20%. As will be explained in more detail to follow, the rejection rate 246 may increase during the given period during fraudulent attacks on the computing system 220 and such increase may be used as an indication of the fraudulent attack.

As may be appreciated after reading this specification, the further review performed by the review module 240 may be time consuming and costly in terms of system resources and actual costs, especially when the review module includes humans to perform one or more of the additional review criteria 245. This is especially true in many embodiments where the large majority of the data transactions in the review portion 320 are ultimately approved. For example, as explained above around 80% of the data transactions in the review portion 320 may ultimately be approved.

It will also be appreciated after reading this specification that the risk score module 220 may make mistakes when assigning a risk score. For example, as shown in FIG. 3A, a portion 321 of the review portion 320 closest to the cutoff with the approved portion 310 is likely to include a large number of data transactions that will ultimately be approved. However, by assigning them a risk score over 60, the data transactions in the portion 321 are subjected to the review process. Of those reviewed, some may be improperly rejected by the review module 240, which is called a false positive. In addition, the reject portion 330 may include a portion 331 closest to the cutoff with the review portion 320 that may include a large number of false positives since these transactions were assigned a risk score above 80, which resulted in their automatic rejection. As may be appreciated, false positives may be viewed as a lost benefit as any value they may have provided is lost when they are rejected.

Accordingly, it may be desirable to reduce the number of data transactions that are subjected to review by the review module 240 and to increase the number of data transactions that are approved so as to reduce the number of false positives. However, care should still be given to ensure that by reducing the number of data transactions that are subjected to further review, the number of false negatives (e.g., those data transactions that should have been rejected, but were instead allowed) is not increased. In addition, care should be given to guard against fraudulent activity that may take advantage of any reduction in review and increase in approval rate. Advantageously, the embodiments disclosed herein provide for a dynamic gate that causes such reduction in number of data transactions being reviewed, increase the number of data transactions being allowed, and guard against increased fraud as a result as will now be explained.

As shown in FIG. 2, the computing system 200 includes a dynamic gating module 250. In operation, the dynamic gating module 250 is able to open a dynamic gate for a given period of time that extends the cutoff between the approved portion 310 and the review portion 320 and the cutoff between the review portion 320 and the rejected portion 330 to thereby potentially increase the number of data transactions that are allowed. In addition, while the dynamic gate is open, the dynamic gating module 250 is further able to reduce the volume of the data transactions that are subjected to the further review by the review module 240 thereby potentially reducing the further review costs. Advantageously, the dynamic gating module 250 is able detect or measure any potential increase in fraudulent activity that may occur as a result of opening the dynamic gate and close the gate in response.

As shown, the dynamic gating module 250 includes a score extender module 251. In operation, the score extender module 251 instructs the risk score module 220 to extend the cutoff between the approved portion 310 and the review portion 320 and the cutoff between the review portion 320 and the rejected portion 330 in one or more iterations while the dynamic gate is open so that a larger number of the data transactions 211-215 may be approved without any further review. The dynamic gating module 250 also includes a review minimize module 252 that in operation instructs the risk score module 220 to minimize or lower the volume or amount of the data transactions in the review portion 320 that are reviewed in one or more iterations while the dynamic gate is open.

The dynamic gating module 250 may also include an opportunity group module 253. As may be appreciated, when the score extender module 251 and/or the review minimize module 252 are in operation, the review portion 320 may be modified so that some of the data transactions in the review portion 320 that were previously subjected to further review will now be approved and allowed to be completed like the data transactions in the approved portion 310. In addition, some of the data transactions that were previously rejected will now be subject to further review, which may lead to at least some of these transactions being approved after the further review, which may decrease the number of false positives. Further, some of the data transactions that were previously approved will now be subject to the further review. However, it may assumed that most of these will ultimately be allowed by the further review while those that are not should not have been approved in the first place, thus lowering the number of false negatives without affecting the approval rate.

In order to help prevent fraudulent attacks or activity from taking advantage of the dynamic gate being opened, the opportunity group module 253 may randomly divide the data transactions in the modified review portion 320 into various opportunity groups 253a, 253b, 253c, and any number of additional opportunity groups as illustrated by the ellipses 253d. When additional data transactions from the review portion are to be approved, a randomizer 254 of the opportunity group module 253 may randomly select one of the opportunity groups 253a-253d to be the allowed data transactions. In this way, any fraudulent attackers may have a more difficult time determining that the dynamic gate is opened based on the identity of the data transactions that are now being allowed.

The dynamic gating module 250 may also include a threshold 255. In operation, the dynamic gating module 250 may monitor the rejection module rate 246 of the review module 240. When the rejection rate 246 exceeds the threshold 255, the dynamic gating module 250 may infer that a fraudulent attack in underway and may close the dynamic gate in response. A time module 256 may also be included that allows the dynamic gating module 250 to set a time period or window in which to operate the dynamic gate. The time period may be any reasonable length. In some embodiments, the time period may be a few minutes, 1 or 2 hours, a longer number of hours, a day, or even a number of days. As may be appreciated, the length of the time period set by the time module 256 may be determined by how likely a fraudulent attack is to occur. For example, if it is likely that perpetrators of the fraudulent attack will discover the dynamic window in a short period of time, then the time period should be set to be set to be smaller while if there is less chance of the dynamic window being discovered, then the time period may be set for a longer period of time. It will also be appreciated that for those embodiments where there are multiple time periods, each time period may be the same or they may be different.

The operation of the dynamic gating module 250 will now be explained in relation to FIG. 3B. FIG. 3B shows that at a first time period 301, the approved portion 310, the review portion 320, and the reject portion 330 are the same as that described in relation to FIG. 3A. That is, those data transactions having a risk score between 1 and 60 (i.e. data transactions 211 and 212) are included in the approved portion 310, those data transactions having a risk score between 60 and 80 (i.e., data transaction 214) are included in the review portion 320, and those data transactions having a risk score between 80 and 100 (i.e. data transaction 213) are included in the reject portion 330).

During the first time period 301, which may be a time period of normal operation prior to the opening of the dynamic gate, the dynamic gate module 250 may determine to begin operation of a dynamic gate. This determination may be based on a predetermined schedule or it may be based on operational factors that are determined in real time. The dynamic gate module 250 may monitor the rejection rate 246 to determine if it is no more than the threshold 255. If the rejection rate 246 is no more than the threshold 255, for example no more than 20% as described above, than the dynamic gate module 250 may infer that the computing system 200 is not currently under a fraudulent attack and may open a dynamic gate. On the other hand, if the rejection rate is more than the threshold 255, the dynamic gate module will not open the dynamic gate as there is a chance that a fraudulent attack is currently occurring.

If there is no fraudulent attack currently occurring, during a time period 302, which may be considered a first iteration of a dynamic gate, the dynamic gate 250 may open the dynamic gate. As mentioned above, the time period 302 may be determined by the time module 256. During the time period 302, the score extender module 251 may direct the risk score module 220 to extend the cutoff between the approved portion 310 and the review portion 320 to be 55 and the cutoff between the review portion 320 and the rejected portion 330 to be 85. The result of this will be that the review portion 320 will now include some data transaction with a score of 55 to 60 and 80 to 85 that were previously not reviewed. Because the review module 240 may have a set amount resources for performing the further review, the opportunity group module 253 may create an opportunity group 340, which may correspond to one or more of the opportunity groups 253a-253d, that equals the amount of data transactions that have been added to the review portion 320 so that the total amount or volume of data transactions in the review portion 320 remains constant. The data transaction in the opportunity group 340 may then become part of the approved portion 310 and may be allowed to complete. In this way, additional data transactions that may have been rejected or subjected to review will be allowed while the overall review load stays constant. It will be appreciated that the extension of the review portion 320 and the approval of the opportunity group 340 during the time period 302 may be considered an example of the dynamic gate as shown at 341.

The dynamic gate module 250 may monitor the rejection rate 246 during the time period 302 to determine if it is no more than the threshold 255. If the rejection rate 246 is no more than the threshold 255 than the dynamic gate module 250 may infer that the computing system 200 is not currently under a fraudulent attack and may keep the dynamic gate 341 open during the entire time period 302. On the other hand, if the rejection rate is more than the threshold 255, the dynamic gate module 250 may infer a fraudulent attack. In such case, the dynamic gate module 250 may close the dynamic gate 341 by returning the system to the state of the initial time period 301.

If there is no fraudulent attack currently occurring, during a time period 303, which may be considered a second iteration of a dynamic gate, the dynamic gate 250 may extend the dynamic gate. As mentioned above, the time period 303 may be determined by the time module 256. During the time period 303, the score extender module 251 may direct the risk score module 220 to extend the cutoff between the approved portion 310 and the review portion 320 to be 50 and the cutoff between the review portion 320 and the rejected portion 330 to be 90. The result of this will be that the review portion 320 will now include some data transaction with a score of 50 to 60 and 80-90 that were previously not reviewed. In order to keep the review load constant, the opportunity group module 253 may create an opportunity group 350, which may correspond to one or more of the opportunity groups 253a-253d, that, in addition to the opportunity group 340 already being approved, equals the amount of data transactions that have been added to the review portion 320 during the time period 303 so that the amount or volume of the data transactions in the review portion 320 remains constant. As shown in FIG. 3B, the size of the opportunity group 350 is larger than the opportunity group 340 since it includes the opportunity group 340. In one embodiment, the opportunity group 350 may be 10% larger than the opportunity group 340. The data transactions in the opportunity group 350 may then become part of the approved portion 310 and may be allowed to complete. It will be appreciated that the extension of the review portion 320 and the approval of the opportunity group 350 during the time period 303 may be considered an example of the dynamic gate as shown at 351.

The dynamic gate module 250 may monitor the rejection rate 246 during the time period 303 to determine if it is no more than the threshold 255. If the rejection rate 246 is no more than the threshold 255 than the dynamic gate module 250 may infer that the computing system 200 is not currently under a fraudulent attack and may keep the dynamic gate 351 open during the entire time period 303. On the other hand, if the rejection rate is more than the threshold 255, the dynamic gate module 250 may infer a fraudulent attack. In such case, the dynamic gate module 250 may close the dynamic gate 351 by returning the system to the state of the initial time period 301.

If there is no fraudulent attack currently occurring, during a time period 304, which may be considered a third iteration of a dynamic gate, the dynamic gate 250 may again implement the dynamic gate. As mentioned above, the time period 304 may be determined by the time module 256. During the time period 304, the lower cutoff and the higher cutoff of the review portion 320 are not extended, but remain the same as during the time period 303. As may be appreciated, it may be undesirable to extend these cutoffs more during the time period 304 as this would result in a higher number of data transaction that should be approved being subject to the further review on the low end and on the high end it would result in many data transactions being reviewed that should be rejected. Since it may be assumed that these transactions would be rejected by the further review, this may result in the rejection rate 246 being artificially raised.

Accordingly, during the time period 304 the amount or volume of the data transactions in the review portion 320 is lowered by the review minimize module 252 to be less than the amount or volume during the time periods 302 and 303. In other words, during the time period 304 the review load of the review module 230 is not kept constant, but is lowered, thus potentially reducing costs associated with the further review done by the review module 230. This may be possible because by the time period 304 occurs, the dynamic gate module 250 may be satisfied that there is no fraudulent attack occurring and so there is less need for further review of those data transactions in the extended cutoff regions.

At the same time, the opportunity group module 253 may create an opportunity group 360, which may correspond to one or more of the opportunity groups 253a-253d, that also includes the opportunity groups 340 and 350 and is thus larger than those opportunity groups. Since the volume of the review portion 320 has been lowered, the opportunity group 360 may include a larger number of data transactions than those that are part of the review portion 320. It will be appreciated that the lowering of the volume of the review portion 320 and the approval of the opportunity group 360 during the time period 304 may be considered an example of the dynamic gate as shown at 361.

The dynamic gate module 250 may continue to monitor the rejection rate 246 during the time period 304 to determine if it is no more than the threshold 255. If the rejection rate 246 is no more than the threshold 255 than the dynamic gate module 250 may infer that the computing system 200 is not currently under a fraudulent attack and may keep the dynamic gate 361 open during the entire time period 304. On the other hand, if the rejection rate is more than the threshold 255, the dynamic gate module 250 may infer a fraudulent attack. In such case, the dynamic gate module 250 may close the dynamic gate 361 by returning the system to the state of the initial time period 301.

If there is no fraudulent attack currently occurring, during a time period 305, which may be considered a fourth iteration of a dynamic gate, the dynamic gate 250 may again implement the dynamic gate. As mentioned above, the time period 305 may be determined by the time module 256. During the time period 305, the volume or amount of the data transactions in the review portion 320 is again lowered by the review minimize module 252 to be less than the volume during the time period 304. In one embodiment, the volume of the review portion 320 during the time period 305 is about 10% of the volume during the initial state of time period 301.

The opportunity group module 253 may create an opportunity group 370, which may correspond to one or more of the opportunity groups 253a-253d, that also includes the opportunity groups 340, 350 and 360 and is thus larger than those opportunity groups. Since the volume of the review portion 320 has been lowered, the opportunity group 370 may include a larger number of data transactions than those that are part of the review portion 320. It will be appreciated that the lowering of the volume of the review portion 320 and the approval of the opportunity group 370 during the time period 305 may be considered an example of the dynamic gate as shown at 371.

The dynamic gate module 250 may continue to monitor the rejection rate 246 during the time period 305 to determine if it is no more than the threshold 255. If the rejection rate 246 is no more than the threshold 255 than the dynamic gate module 250 may infer that the computing system 200 is not currently under a fraudulent attack and may keep the dynamic gate 371 open during the entire time period 305. On the other hand, if the rejection rate is more than the threshold 255, the dynamic gate module 250 may infer a fraudulent attack. In such case, the dynamic gate module 250 may close the dynamic gate 371 by returning the system to the state of the initial time period 301. In addition, to further prevent fraudulent attacks, the dynamic gate module 250 may return to the state of the initial time period 301 upon completion of the time period 305 even in the absence of a fraudulent attack. The process of FIG. 3B may then be repeated at different time periods as needed to reduce the review volume over time and to expose more data transactions to approval that may otherwise be rejected while preventing fraudulent attackers from exploiting the dynamic gate.

As mentioned above, the opportunity group module 253 may include the randomizer 254. In one embodiment, the randomizer 254 may be used to further randomize the selection of the opportunity groups 253a-253d. For example, FIG. 4 illustrates an embodiment where the opportunity groups 253a-253d include nine opportunity groups labeled as groups 1-9. In the embodiment, the randomizer 254 has randomly assigned each of the opportunity groups 1-9 to a random time period D1-D9 over a three day window where the opportunity group may be used during the dynamic gate. In this way, the opportunity groups are only used during the randomly assigned time periods, which may make it harder for fraudulent attackers to learn when a given opportunity group will be utilized in the dynamic window The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

FIG. 5 illustrates a flow chart of an example method 500 for reducing an amount of data transactions that are subjected to further review when determining if the data transactions should be approved or rejected. The method 500 will be described with respect to one or more of FIGS. 2-4 discussed previously.

The method 500 includes determining risk scores for a plurality of data transactions (act 510). The risk scores define a first cutoff between a first portion of the plurality of data transactions that are to be approved and a second portion of the plurality of data transactions that are to be subjected to further review and a second cutoff between the second portion and a third portion of the plurality of data transactions that are to be that are to be rejected. For example, as previously described the risk score module 220 may determine the risk scores 221-224 for the data transactions 211-214. The risk scores may define a first cutoff between an approved portion 225,310 of data transactions that are to be approved and a review portion 227,320 of data transactions that are to be subjected to further review. A second cutoff between the review portion 227,320 and reject portion 226,330 of data transactions that are to be rejected may also be defined. In the embodiment of FIG. 3B, the first cutoff is 60 and the second cutoff is 80.

The method 500 includes, during a first time period, extending the first and second cutoffs such that the second portion includes some of the data transactions of the first portion and third portion that were not previously included in the second portion (act 520). For example, as previously described the score extender module 251 may cause the risk score module 220 to extend the cutoff between the approved portion 310 and the review portion 320 and the cutoff between the review portion 320 and the rejected portion 330 in one or more iterations while the dynamic gate is open so that a larger number of the data transactions 211-215 may be approved without any further review.

The method 500 includes during the first time period, creating a first opportunity group of data transactions that are to be approved (act 530). The first opportunity group may include at least some data transactions that were part of the second and third portions. For example, as previously described the opportunity group module 253 may during a first time period 302 create an opportunity group such as the opportunity group 253A or 340. As discussed, the opportunity group may include some of the data transactions that were previously part of the review portion 320 and the reject portion 330.

The method 500 may include, during the first time period, comparing a rejection rate of the data transactions included in the second portion to a threshold to determine if the rejection rate is no more than the threshold (act 540). As previously described the dynamic gate module 250 may monitor the rejection rate 246 during the time period 302 to determine if it is no more than the threshold 255. If the rejection rate 246 is no more than the threshold 255 than the dynamic gate module 250 may infer that the computing system 200 is not currently under a fraudulent attack and may keep the dynamic gate 341 open during the entire time period 302. On the other hand, if the rejection rate is more than the threshold 255, the dynamic gate module 250 may infer a fraudulent attack. In such case, the dynamic gate module 250 may close the dynamic gate 341 by returning the system to the state of the initial time period 301.

The method 500 includes, in response to determining that the rejection rate is no more than the threshold, during a second time period, minimizing a volume of the second portion by removing some of data transactions from the second portion that were included during the first time period (act 550). For example, as previously described the review minimize module 252 may, during the second time period 304, lower the volume or amount of data transactions in the review portion 320.

The method 500 includes, during the second time period, creating a second opportunity group of data transactions that are to be approved (act 560). The second opportunity group includes at least some data transactions that were part of the second and third portions during the first time period. The second opportunity group is larger than the first opportunity group. For example, as previously described the opportunity group module 253 may during the second time period 304 create an opportunity group such as the opportunity group 253B or 360. As discussed, the opportunity group may include some of the data transactions that were previously part of the review portion 320 and the reject portion 330 during the time period 302 and may be larger than the opportunity group 340.

The method 500 includes during the second time period, comparing the rejection rate of the data transactions included in the second portion to the threshold to determine if the rejection rate is no more than the threshold (act 570). For example, as previously described the dynamic gate module 250 may continue to monitor the rejection rate 246 during the time period 304 to determine if it is no more than the threshold 255. If the rejection rate 246 is no more than the threshold 255 than the dynamic gate module 250 may infer that the computing system 200 is not currently under a fraudulent attack and may keep the dynamic gate 361 open during the entire time period 304. On the other hand, if the rejection rate is more than the threshold 255, the dynamic gate module 250 may infer a fraudulent attack. In such case, the dynamic gate module 250 may close the dynamic gate 361 by returning the system to the state of the initial time period 301.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system for reducing an amount of data transactions that are subjected to further review when determining if the data transactions are to be approved or rejected, the computing system comprising:
   at least one processor; and
   a computer readable hardware storage device having stored thereon computer-executable instructions which, when executed by the at least one processor, cause the computing system to perform the following:
   determine risk scores for a plurality of data transactions;
   during a first time period,
      define a first risk score cutoff and a second risk score cutoff, the second risk score cutoff being greater than the first risk score cutoff;
      create a first opportunity group of data transactions that are to be approved, the first opportunity group including a first number of data transactions, each data transaction in the first opportunity group having a risk score between the first risk score cutoff and the second risk score cutoff;
   review the data transactions that have a risk score between the first risk score cutoff and the second risk score cutoff and are not within the first opportunity group, the reviewing a data transaction comprising applying one or more additional criteria to the data transaction to further determine whether the data transaction is to be approved or rejected;
   compare a rejection rate of the reviewed data transactions to a threshold to determine if the rejection rate is within the threshold; and
   dynamically gate incoming data transactions based on the comparison, the dynamically gating comprising:
      in response to determining that the rejection rate is within the threshold, during a second time period, creating a second opportunity group of data transactions that are to be approved, the second opportunity group including a second number of data transactions that is larger than the first number of data transactions of the first opportunity group, such that fewer number of transactions will be further reviewed, the creating the second opportunity group including at least one of (1) updating the first risk score cutoff or the second risk score cutoff, or (2) increasing a ratio of data transactions that have a risk score between the first and second risk score cutoffs to be included in the second opportunity group;
      causing a data transaction that has a risk score lower than the current first risk score cutoff or is within the second opportunity group to be approved;
      causing a data transaction that has a risk score higher than the current first risk score cutoff and is not within the second opportunity group to be rejected; and
      comparing a rejection rate of the reviewed data transactions in the second opportunity group to determine if the rejection rate is within the threshold.

2. The computing system according to claim 1, wherein if, during either the first or the second time periods, the rejection rate is determined to be more than the threshold, the computing system reverts to an initial state.

3. The computing system according to claim 1, further comprising during a third time period that is between the first time period and the second time:
   further extending a range between the first and second cutoffs beyond a range between the first and second cutoffs of the first time period such that the data transactions between the first and second cutoffs of the second time period include one or more data transactions having risk scores that were not previously included during the first time period;
   creating a third opportunity group of data transactions that are to be approved, the third opportunity group including at least one data transaction having a risk score that was within a risk score range that has a risk score lower than the first cutoff during the first time period, wherein the third opportunity group is larger than the first opportunity group but smaller than the second opportunity group; and
   comparing the rejection rate of the data transactions included in the second opportunity group to the threshold to determine if the rejection rate exceeds the threshold, wherein if the rejection is more than the rejection rate, the computing system reverts to an initial state.

4. The computing system according to claim 1, further comprising during a fourth time period that is after the second time period:
   in response to determining that the rejection rate does not exceed the threshold during the second time period,
      creating a fourth opportunity group of data transactions that are to be approved, the fourth opportunity group including at least one data transaction having a risk score that was within a risk score range of the second and third opportunity groups during the second time period, wherein the fourth opportunity group is larger than the second opportunity group; and
      comparing the rejection rate of the data transactions included in the fourth opportunity group to the threshold to determine if the rejection rate exceeds the threshold, wherein if the rejection rate is determined to exceed the threshold, the computing system reverts to an initial state.

5. The computing system of claim 4, wherein the computing system reverts to the initial state after the completion of the fourth time period even if the rejection rate is determined to exceed the threshold.

6. The computing system of claim 4, wherein a volume of the reviewed data transactions during the fourth time period is 10% of a volume of the reviewed data transactions during the initial state.

7. The computing system of claim 1, wherein the second opportunity group is at least 10% larger than the first opportunity group.

8. The computing system of claim 1, wherein the first and second time periods are the same length.

9. The computing system of claim 8, wherein the first and second time periods are one of minutes, hours, or days.

10. The computing system of claim 1, further comprising:
   an act of randomly selecting one or more of the first and second opportunity groups.

11. A method for reducing an amount of data transactions that are subjected to further review when determining if the data transactions are to be approved or rejected, the method comprising:
   determining risk scores for a plurality of data transactions;
   during a first time period,
      defining a first risk score cutoff and a second risk score cutoff, the second risk score cutoff being greater than the first risk score cutoff;
      creating a first opportunity group of data transactions that are to be approved, the first opportunity group including a first number of data transactions, each data transaction in the first opportunity group having a risk score between the first risk score cutoff and the second risk score cutoff;
      reviewing the data transactions that have a risk score between the first risk score cutoff and the second risk score cutoff and are not within the first opportunity group, the reviewing a data transaction comprising applying one or more additional criteria to the data transaction to further determine whether the data transaction is to be approved or rejected;
      comparing a rejection rate of the reviewed data transactions to a threshold to determine if the rejection rate is within the threshold; and
   dynamically gating incoming data transactions based on the comparison, the dynamically gating comprising:
      in response to determining that the rejection rate is within the threshold, during a second time period,
         creating a second opportunity group of data transactions that are to be approved, the second opportunity group including a second number of data transaction that is larger than the first opportunity group, such that fewer number of transactions will be further reviewed, the creating the second opportunity group including at least one of (1) updating the first risk score cutoff or the second risk score cutoff, or (2) increasing a ratio of data transactions that have a risk score between the first and second risk score cutoffs to be included in the second opportunity group;
         causing a data transaction that has a risk score lower than the current first risk score cutoff or is within the second opportunity group to be approved;
         causing a data transaction that has a risk score higher than the current first risk score cutoff and is not within the second opportunity group to be rejected; and
         comparing a rejection rate of the reviewed data transactions in the second opportunity group to determine if the rejection rate is within the threshold.

12. The method according to claim 11, wherein if, during either the first or the second time periods, the rejection rate is determined to be more than the threshold, reverting to an initial state.

13. The method according to claim 11, further comprising during a third time period that is between the first time period and the second time:
   further extending arrange between the first and second cutoffs beyond arrange between the first and second cutoffs of the first time period such that the data transactions between the first and second cutoffs of the second time period include one or more data transactions having risk scores that were not previously included during the first time period;
   creating a third opportunity group of data transactions that are to be approved, the third opportunity group including at least one data transaction having a risk score that was within of a score range that has a risk score lower than the first cutoff during the first time period, wherein the third opportunity group is larger than the first opportunity group but smaller than the second opportunity group; and
   comparing the rejection rate of the data transactions included in the second opportunity group to the threshold to determine if the rejection rate exceeds the threshold, wherein if the rejection is more than the rejection rate, reverting to an initial state.

14. The method according to claim 11, further comprising during a fourth time period that is after the second time period:
   in response to determining that the rejection rate does not exceed the threshold during the second time period,
      creating a fourth opportunity group of data transactions that are to be approved, the fourth opportunity group including at least one data transaction having a risk score that was within a risk score range of the second and third opportunity groups during the second time period, wherein the fourth opportunity group is larger than the second opportunity group; and
      comparing the rejection rate of the data transactions included in the fourth opportunity group to the threshold to determine if the rejection rate does not exceed the threshold, wherein if the rejection rate is determined to exceed the threshold, reverting to an initial state.

15. The method according to claim 14, wherein the reverting to the initial state after the completion of the fourth time period even if the rejection rate is determined not to exceed the threshold.

16. The method according to claim 14, wherein a volume of the reviewed data transactions during the fourth time period is 10% of a volume of the reviewed data transactions during the initial state.

17. The method according to claim 11, wherein the second opportunity group is at least 10% larger than the first opportunity group.

18. The method according to claim 11, wherein the first and second time periods are the same length.

19. The method according to claim 11, further comprising:
  randomly selecting one or more of the first and second opportunity groups.

20. A computer program product comprising one or more hardware storage devices having stored thereon computer executable instructions, the computer executable instructions being executable by one or more processors of a computing system to cause the computing system to perform the following:
  determine risk scores for a plurality of data transactions;
  during a first time period,
    define a first risk score cutoff and a second risk score cutoff, the second risk score cutoff being greater than the first risk score cutoff;
    create a first opportunity group of data transactions that are to be approved, the first opportunity group including a first number of data transactions, each data transaction in the first opportunity group having a risk score between the first risk score cutoff and the second risk score cutoff;
    review the data transactions that have a risk score between the first risk score cutoff and the second risk score cutoff and are not within the first opportunity group, the reviewing a data transaction comprising applying one or more additional criteria to the data transaction to further determine whether the data transaction is to be approved or rejected;
  compare a rejection rate of the reviewed data transactions to a threshold to determine if the rejection rate is within the threshold; and
  dynamically gate incoming data transactions based on the comparison, the dynamically gating comprising:
    in response to determining that the rejection rate is within the threshold, during a second time period,
      creating a second opportunity group of data transactions that are to be approved, the second opportunity group including a second number of data transactions that is larger than the first number of data transaction of the first opportunity group, such that fewer number of transactions will be further reviewed, the creating the second opportunity group including at least one of (1) updating the first risk score cutoff or the second risk score cutoff, or (2) increasing a ratio of data transactions that have a risk score between the first and second risk score cutoffs to be included in the second opportunity group;
    causing a data transaction that has a risk score lower than the current first risk score cutoff or is within the second opportunity group to be approved;
    causing each data transaction that has a risk score higher than the current first risk sore cutoff and is not within the second opportunity group to be rejected; and
    comparing a rejection rate of the reviewed data transaction in the second opportunity group to determine if the rejection rate is within the threshold.

* * * * *